US012717908B2

(12) United States Patent
Albero et al.

(10) Patent No.: US 12,717,908 B2
(45) Date of Patent: Aug. 25, 2026

(54) ARTIFICIAL INTELLIGENCE-BASED DETERMINATION OF DATA SECURITY TECHNIQUES TO BE IMPLEMENTED FOR ELECTRONIC DATA TRANSMISSIONS

(71) Applicant: BANK OF AMERICA CORPORATION, Charlotte, NC (US)

(72) Inventors: George Albero, Charlotte, NC (US); Jeffrey K. Johnson, Cornelius, NC (US); Sanjay Lohar, Charlotte, NC (US); Tonya Kyra Miller, Charlotte, NC (US); Erica Reliford, Kannapolis, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 130 days.

(21) Appl. No.: 18/766,344

(22) Filed: Jul. 8, 2024

(65) Prior Publication Data

US 2026/0010621 A1 Jan. 8, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 10,826,876 B1 11/2020 Sinn
10,887,291 B2 1/2021 Davis
11,588,796 B2 2/2023 Cheng
11,770,391 B1 * 9/2023 Bakthavatchalam .. G06N 20/20 726/23
11,954,186 B2 4/2024 Kalia
11,956,268 B2 * 4/2024 Hammitt ............. H04L 63/1408
11,985,075 B1 * 5/2024 Manoukian ........... H04L 47/827
2012/0011592 A1 * 1/2012 Loytynoja ............. G10L 19/018 726/26
2016/0330219 A1 11/2016 Hasan
2020/0045080 A1 * 2/2020 Wisniewski ........ H04L 63/0281
2021/0050024 A1 * 2/2021 Wouters ................ G10L 19/125

(Continued)

FOREIGN PATENT DOCUMENTS

EP 4459487 A1 * 11/2024 ......... G06F 21/6245
WO WO-2023149715 A1 * 8/2023 .............. H04W 4/90

*Primary Examiner* — Christopher A Revak
(74) *Attorney, Agent, or Firm* — Moore & Van Allen PLLC; Nicholas C. Russell

(57) ABSTRACT

Implementation, either prior to or during data transmission, of artificial intelligence in the form of machine learning model(s) to (i) determine whether a specific data set requires security and, in response to determining that the data set requires security, (ii) identifying which security technique or combination of security techniques are most suitable/optimal for the data set. Subsequently, the identified security measures are applied to the data set prior to or during data transmission. The determination of whether to a data set requires security and the identification of the security techniques balances the need for security in terms of data sensitivity and/or criticality against availability and/or efficiency of computing resources required to perform/apply the security technique(s) to the data set.

14 Claims, 5 Drawing Sheets

(56) References Cited

U.S. PATENT DOCUMENTS

| | | | | |
|---|---|---|---|---|
| 2021/0117567 | A1* | 4/2021 | Braghin | G06F 21/6245 |
| 2022/0353299 | A1* | 11/2022 | O'Neil | H04L 41/0894 |
| 2023/0061864 | A1* | 3/2023 | Calzolari | H04B 1/0458 |
| 2024/0073221 | A1 | 2/2024 | Vahid | |
| 2024/0160704 | A1* | 5/2024 | Albero | G06F 21/31 |
| 2025/0039239 | A1* | 1/2025 | Parla | H04L 63/1425 |

* cited by examiner

ARTIFICIAL INTELLIGENCE-BASED DETERMINATION OF DATA SECURITY TECHNIQUES TO BE IMPLEMENTED FOR ELECTRONIC DATA TRANSMISSIONS

FIELD OF THE INVENTION

The present invention is generally directed to data security and, more specifically, implementing artificial intelligence to determine whether a data set being transmitted requires security, in response to determining that the data set requires security, identifying which data security technique or combination of data security techniques to apply the data set and applying the identified security techniques to the data set.

BACKGROUND

Each time data is transmitted across a computing network there is a possibility that such data may intercepted and/or accessed by unauthorized parties. For example, an unauthorized party may perform an "on-path" attack otherwise referred to a man-in-middle (MitM) attack to intercept and/or alter a data transmission between two or more entities. Interception of data can be done by various methods including spoofing, DNS (Domain Name System) spoofing, session hijacking or the like. In some instances, the attacker/wrongdoer can alter the data being transmitted between entities, such as by, injecting malicious content, modifying data, or otherwise causing errors in the data. Such on-path attacks have severe consequences, including identity misappropriation, monetary loss, and compromised data integrity.

Therefore, a need exists to develop systems, computerized methods and the like that serve to provide security to data during data transmission. The desired systems, computerized methods and the like should not only serve to thwart a would-be wrongdoer from intercepting a data transmission but should also prevent the data from being accessed and manipulated in the event of an unauthorized interception of the data. Further, the desired systems, computerized methods and the like should balance the need to protect critical and/or private data against the availability and/or efficiency of computing resources required to implement security techniques/measures.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by identifying and applying security measure(s)/techniques to data set determined to require such either prior to or during transmission/communication of the data set. In this regard, the invention implements, prior to or during (i.e., "inflight") data transmission, Artificial Intelligence (AI) in the form of Machine Learning (ML) model(s) to (i) determine whether a specific data set requires security and, in response to determining that the data set requires security, (ii) identifying which security technique or combination of security techniques are most suitable/optimal for the data set. Subsequently, the identified security measures are applied to the data set prior to or during data transmission.

In specific embodiments of the invention, the AI/ML model(s) make the determination as to whether security is required based on assessing the need for security based on the sensitivity and/or criticality of the data elements in the data set and comparing the need for security against the availability and/or efficiency of computer resources required implement the security measures/techniques on the data set. Further, in other specific embodiments of the invention, the AI/ML models identify which security technique or combination of which are most suitable/optimal by comparing various factors including, but not limited to, the sensitivity and/or criticality of the data elements in the data set, the identity of the data recipient(s), the historical success rates of the individual security techniques or combinations of security techniques, the availability and/or efficiency of computer resources required to implement/apply the security technique(s) to the data set and the like.

In specific embodiments of the invention, the security techniques that are identified and applied include, but are not limited to, data masking techniques, such as obfuscation, scrambling, anonymization (i.e., false/decoy data); embedded hidden information, such as stenography, water marking; and multiplexing and spread spectrum techniques (i.e., frequency hopping).

A system for securing transmission of a data set defines first embodiments of the invention. The system includes a first computing platform including a first memory and one or more first computing processor devices in communication with the first memory. The first memory stores an Artificial Intelligence (AI) engine including at least one Machine Learning (ML) model. The AI engine is executable by at least one of the one or more computing processor devices. The AI engine is configured to receive a data set that includes a plurality of data elements. In specific embodiments of the system, the data set is awaiting data transmission, while in other embodiments of the system, the data set is received while inflight (during transmission from a data sending entity to one or more data recipient entities).

In response to data set receipt, the AI engine is configured to execute the one or more of the ML model(s). The ML model(s) is/are trained to (i) determine whether to implement one or more data security techniques on the data set and, in response to determining that one or more data security techniques are to be implemented on the data set, (ii) identify at least one data security technique from amongst a plurality of data security techniques, wherein the at least one data security technique is identified based on the at least one data security technique being most suitable for securing the data set during transmission.

The system further includes a second computing platform having a second memory and one or more second computing processor devices in communication with the second memory. The second memory stores a plurality of data security applications, each data security application executable by at least one of the one or more computing processor devices and configured to implement one of the plurality of data security techniques. In response to the ML model(s) identifying the at least one data security technique, at least one of the plurality of data security applications corresponding to the least one data security technique is executed, on the data set, to implement/apply the least one data security technique on/to the data set.

In specific embodiments of the system, the determination of whether to implement one or more data security techniques on the data set is based at least on a comparison between (a) current availability and efficiency of computing resources required to execute the plurality of data security applications and (b) a need for security associated with one or more of the data elements in the data set.

In other specific embodiments of the system, the identification of the at least one data security technique that is the most suitable for securing the data set during transmission defines most suitable based on one or more of (a) privacy and criticality of the data elements in the data set, (b) identity of one or more data recipient entities of the data set, (c) historical success rates associated with each of plurality of data security techniques, and (d) current availability and efficiency of computing resources required to execute a corresponding one of the plurality of data security applications.

In further specific embodiments of the system, the plurality of data security techniques include data masking techniques including one or more of (i) data obfuscation, (ii) data scrambling, and (iii) data anonymization. In other related specific embodiments of the system, the plurality of data security techniques include frequency hopping. While in other related specific embodiments of the system, the plurality of data security techniques comprises embedded hidden information including one or more of (i) stenography and (ii) digital watermarking.

In additional specific embodiments of the system, the identification of the at least one data security technique that is the most suitable for securing the data set during transmission is further defines as identification of a combination of two or more of the plurality of data security techniques, wherein the combination of two or more data security techniques are identified based on the combination of two or more of the data security techniques being most suitable for securing the data set during transmission.

Moreover, in further embodiments of the system, (i) the AI engine is configured to receive the data set and execute the at least one Machine Learning (ML) model and (ii) the at least one of the plurality of data security applications is configured to be executed while the data set is inflight (i.e., during data transmission between a data sending entity and one or more data recipient entities).

A computer-implemented method for securing a data set transmission defines second embodiments of the invention. The computer-implemented method is executable by one or more computing processor devices. The computer-implemented method includes receiving a data set that includes a plurality of data elements. In response to receiving the data set, the computer-implemented method includes executing at least one trained Machine Learning (ML) model to determine whether to implement one or more data security techniques on the data set. In response to determining that data security technique(s) is/are to be implemented on the data set, the computer-implemented method includes executing the at least one trained Machine Learning (ML) model to identify at least one data security technique from amongst a plurality of data security techniques. The at least one data security technique is identified based on the at least one data security technique being most suitable for securing the data set during transmission. In response to the ML model identifying the at least one data security technique, the computer-implemented method includes implementing/applying the at least one data security technique on/to the data set.

In specific embodiments of the computer-implemented method, executing the at least one trained Machine Learning (ML) model to determine further comprises executing the at least one trained Machine Learning (ML) model to determine whether to implement one or more data security techniques on the data set, the determination is based at least on a comparison between (a) current availability and efficiency of computing resources required to execute the plurality of data security applications and (b) a need for security associated with one or more of the data elements in the data set.

In further specific embodiments of the computer-implemented method, executing the at least one trained Machine Learning (ML) model to identify further comprises executing the at least one trained Machine Learning (ML) model to identify the at least one data security technique, the at least one data security technique is identified as the most suitable for securing the data set during transmission, wherein the most suitable is based on one or more of (a) privacy and criticality of the data elements in the data set, (b) identity of one or more data recipient entities of the data set, (c) historical success rates associated with each of plurality of data security techniques, and (d) current availability and efficiency of computing resources required to execute a corresponding one of the plurality of data security applications.

In still further specific embodiments of the computer-implemented method, the plurality of data security techniques comprises (i) data masking techniques including one or more of data obfuscation, data scrambling, and data anonymization, (ii) embedded hidden information including one or more of stenography and digital watermarking, and (iii) frequency hopping.

In additional specific embodiments of the computer-implemented method, executing the at least one trained Machine Learning (ML) model to identify further comprises executing the at least one trained to identify a combination of two or more of the plurality of data security techniques. In such embodiments, the combination of two or more data security techniques are identified based on the combination of two or more of the data security techniques being most suitable for securing the data set during transmission.

Moreover, in additional specific embodiments of the computer-implemented method, the method is executed while the data set is inflight between a data sending entity and one or more data recipient entities (i.e., during transmission).

A computer program product including a non-transitory computer-readable medium defines third embodiments of the invention. The non-transitory computer-readable medium includes a set of codes for causing one or more computing devices to receive the data set that includes a plurality of data elements. In addition, the non-transitory computer-readable medium includes a set of codes for causing one or more computing devices to execute at least one trained Machine Learning (ML) model to determine whether to implement one or more data security techniques on the data set. Further, the non-transitory computer-readable medium includes a set of codes for causing one or more computing devices to, in response to determining that one or more data security techniques are to be implemented on the data set, execute the at least one trained Machine Learning (ML) model to identify at least one data security technique from amongst a plurality of data security techniques. The at least one data security technique is identified based on the at least one data security technique being most suitable for securing the data set during transmission. Further, the non-transitory computer-readable medium includes a set of codes for causing one or more computing devices to, in response to the ML model identifying the at least one data security technique, implement the at least one data security technique on the data set.

In specific embodiments of the computer program product, the set of codes for causing the one or more computing devices to execute the at least one trained Machine Learning (ML) model to determine further cause the one or more computing devices to execute the at least one trained Machine Learning (ML) model to determine whether to implement one or more data security techniques on the data set, such that, the determination is based at least on a comparison between (a) current availability and efficiency of computing resources required to execute the plurality of data security applications and (b) a need for security associated with one or more of the data elements in the data set.

In additional specific embodiments of the computer program product, the set of codes for causing the one or more computing devices to execute the at least one trained Machine Learning (ML) model to identify further cause the one or more computing devices to execute the at least one trained Machine Learning (ML) model to identify the at least one data security technique, such that, the at least one data security technique is identified as the most suitable for securing the data set during transmission, wherein the most suitable is based on one or more of (a) privacy and criticality of the data elements in the data set, (b) identity of one or more data recipient entities of the data set, (c) historical success rates associated with each of plurality of data security techniques, and (d) current availability and efficiency of computing resources required to execute a corresponding one of the plurality of data security applications.

In further specific embodiments of the computer program product, the plurality of data security techniques include (i) data masking techniques including one or more of data obfuscation, data scrambling, and data anonymization, (ii) embedded hidden information including one or more of stenography and digital watermarking, and (iii) frequency hopping.

In still further specific embodiments of the computer program product, the set of codes for causing the one or more computing devices to execute the at least one trained Machine Learning (ML) model to identify further cause the one or more computing devices to execute the at least one trained to identify a combination of two or more of the plurality of data security techniques. In such embodiments, the combination of two or more data security techniques are identified based on the combination of two or more of the data security techniques being most suitable for securing the data set during transmission.

Moreover, in further specific embodiments of the computer program product, the sets of codes are executed while the data set is inflight between a data sending entity and one or more data recipient entities.

Thus, as described in detail above, present embodiments of the invention include systems, methods, computer program products and/or the like that implement, either prior to or during data transmission, Artificial Intelligence (AI) in the form of Machine Learning (ML) model(s) to (i) determine whether a specific data set requires security and, in response to determining that the data set requires security, (ii) identifying which security technique or combination of security techniques are most suitable/optimal for the data set. Subsequently, the identified security measures are applied to the data set prior to or during data transmission. The determination of whether to a data set requires security and the identification of the security techniques balances the need for security in terms of data sensitivity and/or criticality against availability and/or efficiency of computing resources required to perform/apply the security technique (s) to the data set.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
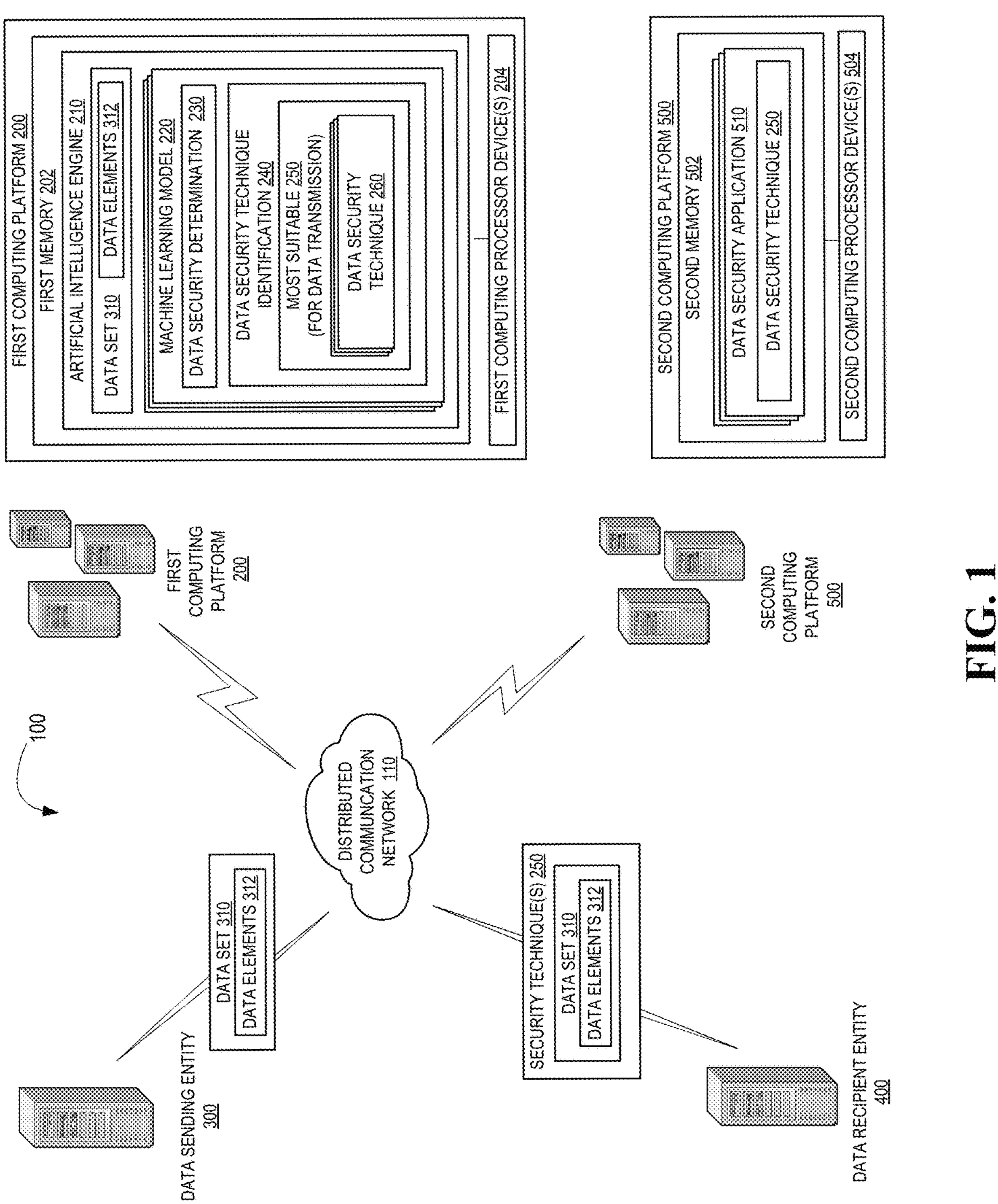
Figure 2:
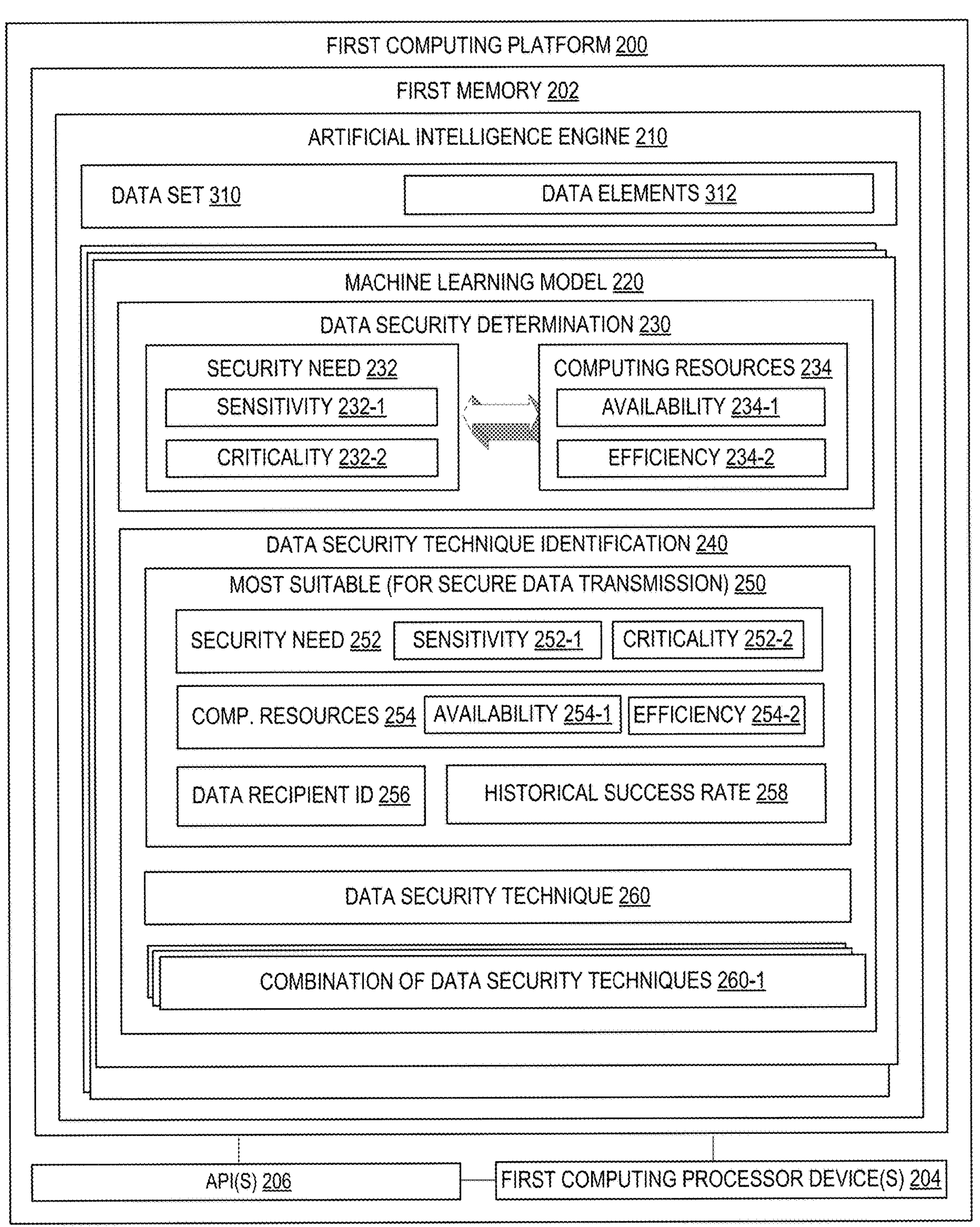
Figure 3:
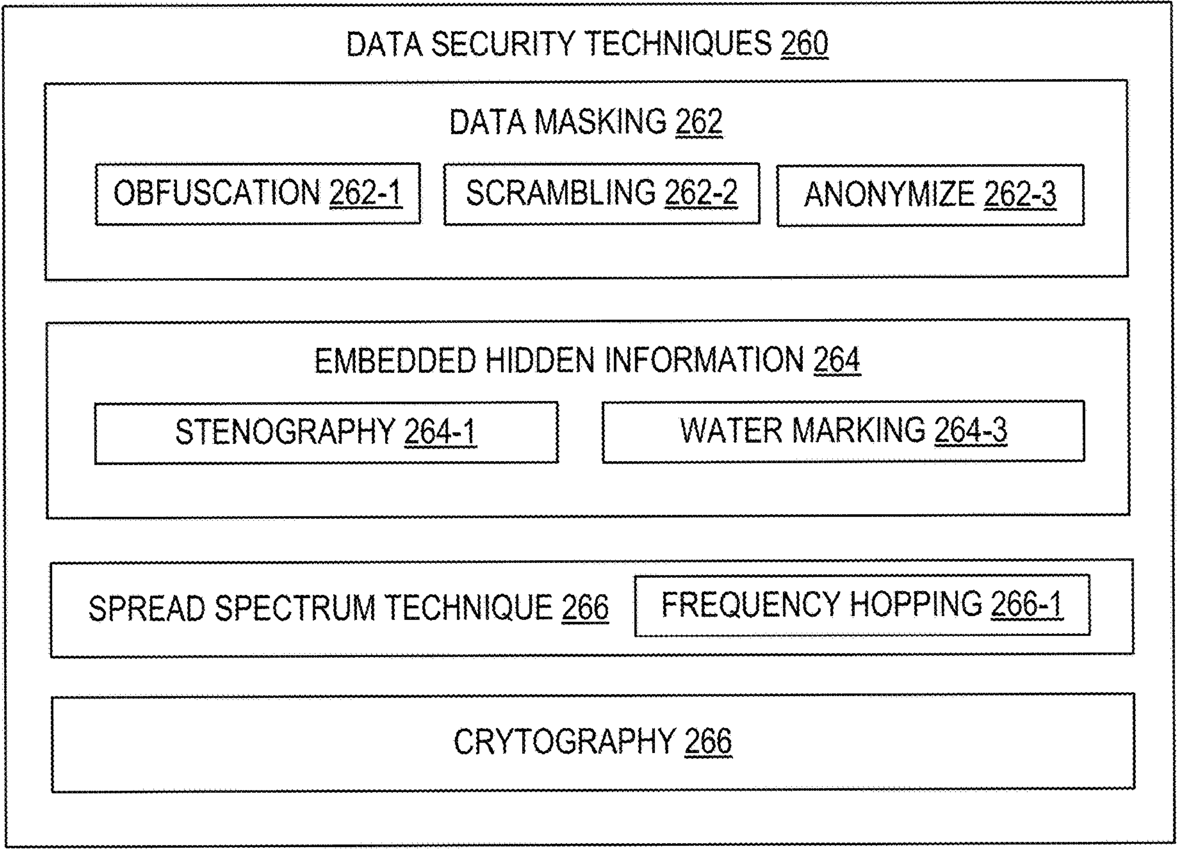
Figure 4:
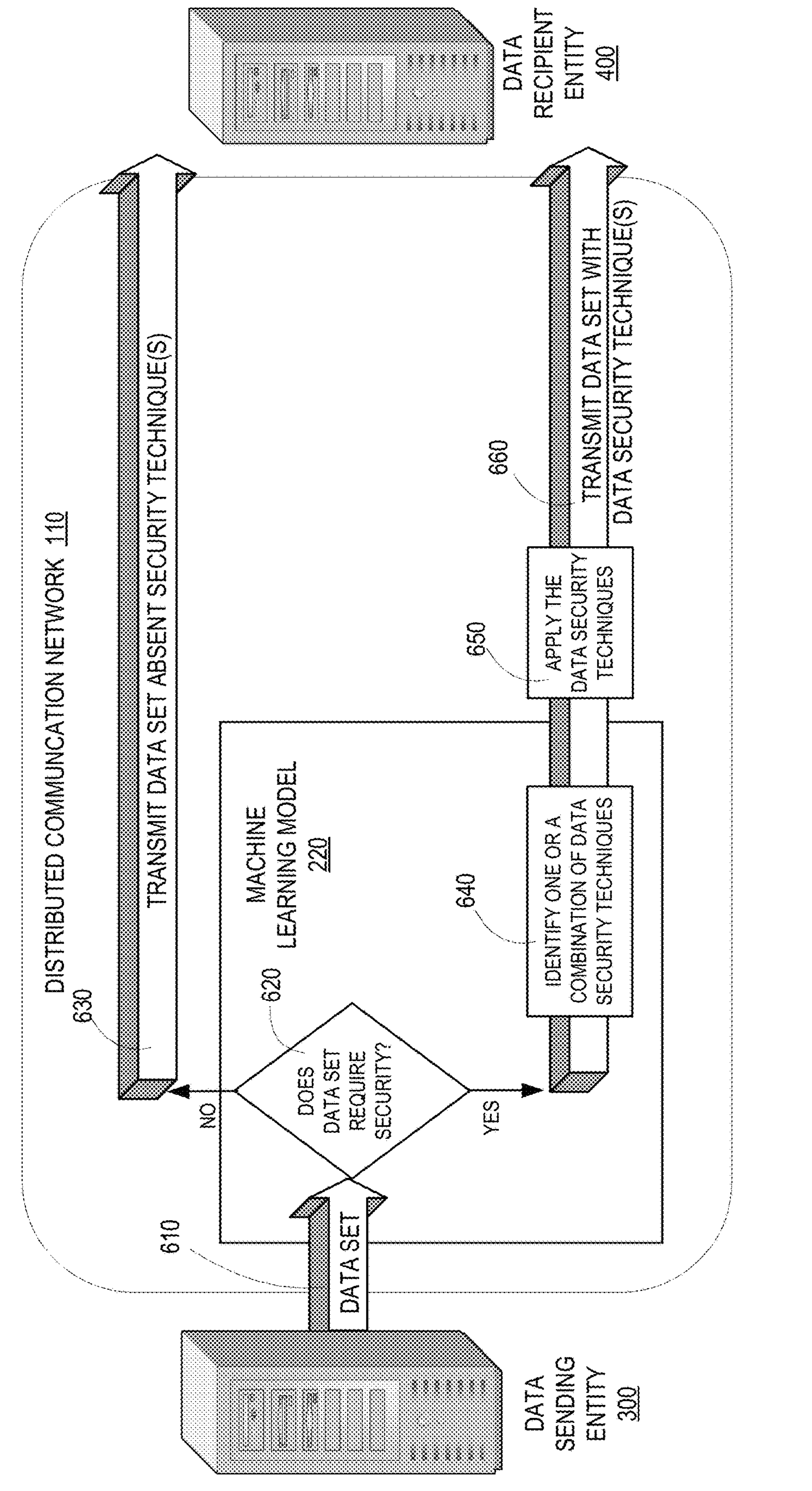
Figure 5:
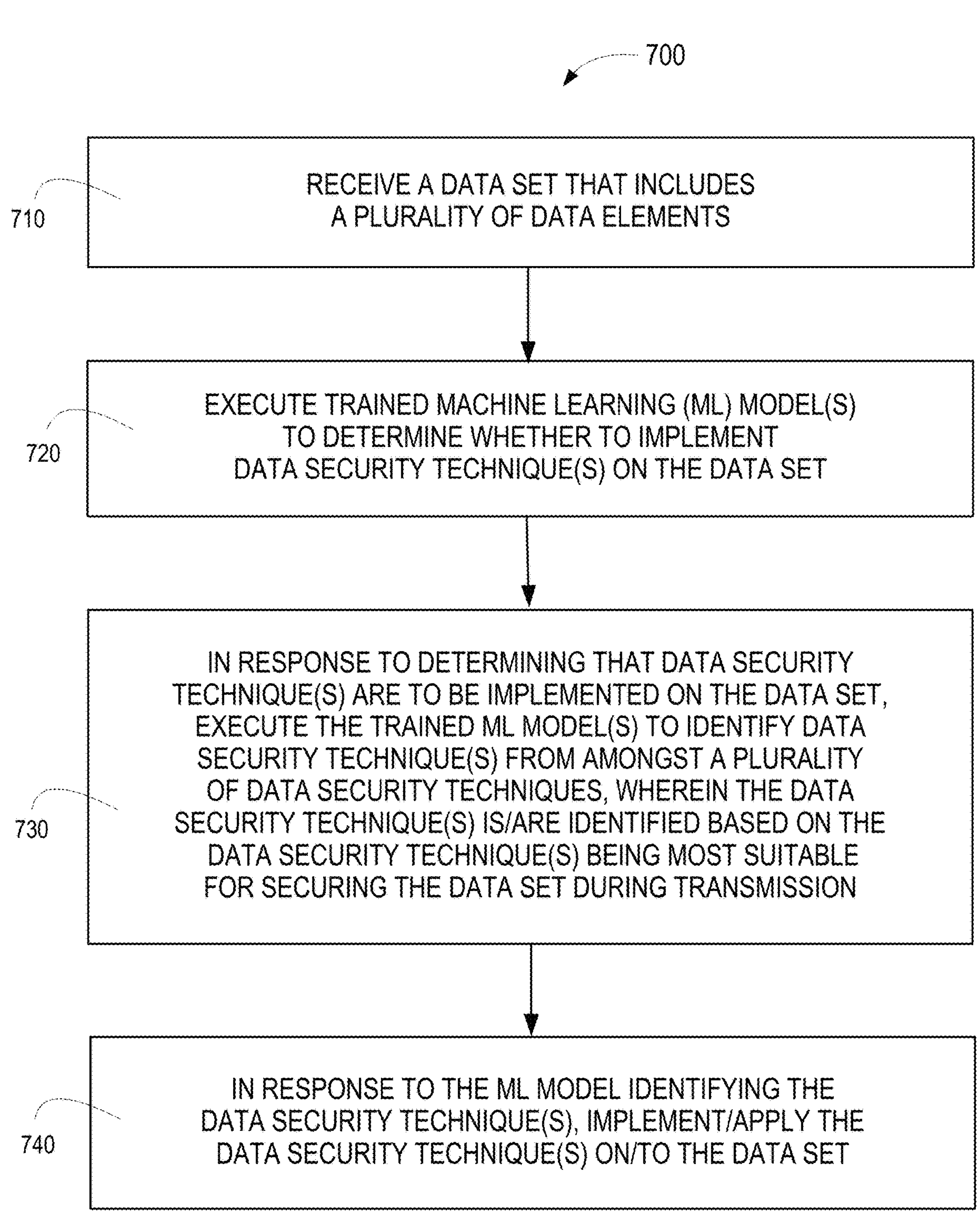

Having thus described embodiments of the disclosure in general terms, reference will now be made to the accompanying drawings, wherein:

FIG. 1 is a schematic/block diagram of a system for securing a data transmission, in accordance with embodiments of the present invention;

FIG. 2 is a block diagram of a computing platform including an AI platform including ML models for securing a data transmission, in accordance with alternate embodiments of the present invention;

FIG. 3 is a block diagram highlighting examples of data security techniques identified and applied, in accordance with embodiments of present invention;

FIG. 4 is a schematic/flow diagram of a methodology for securing a data transmission, in accordance with embodiments of the invention; and FIG. 5 is a flow diagram of a method for securing a data transmission, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for identifying and applying security measure(s)/techniques to data set determined to require such either prior to or during transmission/communication of the data set. In this regard, the invention implements Artificial Intelligence (AI) in the form of Machine Learning (ML) model(s) to (i) determine whether a specific data set requires security and, in response to determining that the data set requires security, (ii) identifying which security technique or combination of security techniques are most suitable/optimal for the data set. Subsequently, the identified security measures are applied to the data set prior to or during data transmission.

In specific embodiments of the invention, the AI/ML model(s) make the determination as to whether security is required based on assessing the need for security based on the sensitivity and/or criticality of the data elements in the data set and comparing the need for security against the availability and/or efficiency of computer resources required implement the security measures/techniques on the data set. Further, in other specific embodiments of the invention, the AI/ML models identify which security technique or combination of which are most suitable/optimal by comparing various factors including, but not limited to, the sensitivity and/or criticality of the data elements in the data set, the identity of the data recipient(s), the historical success rates of the individual security techniques or combinations of security techniques, the availability and/or efficiency of computer resources required to implement/apply the security technique(s) to the data set and the like.

In specific embodiments of the invention, the security techniques that are identified and applied include, but are not limited to, data masking techniques, such as obfuscation, scrambling, anonymization (i.e., false/decoy data); embedded hidden information, such as stenography, water marking; multiplexing and spread spectrum techniques (i.e., frequency hopping) and cryptography.

Referring to FIG. 1, a schematic/block diagram is presented of a system 100 for providing security to a data transmission, in accordance with embodiments of the present invention. The system is implemented within a distributed communication network 110, which may include the Internet, one or more intranets, one or more cellular networks or the like. The system includes first computing platform 200, which includes first memory 202 and one or more first computing processor devices 204 in communication with first memory 202. First memory 202 stores an Artificial Intelligence (AI) engine 210, which includes one or more Machine Learning (ML) Models 220. The AI engine 210 is executable by at least one of the one or more first computing processor devices 204. AI engine 210 is configured to receive a data set 310, which includes a plurality of data elements 312. In specific embodiments of the invention, the data set 310 is received directly or indirectly from data sending entity 300 and is configured for transmission/communication to data recipient entity 400 via distributed communication network 110. In specific embodiments of the invention, AI engine 210 is implemented at data sending entity 300, either prior to transmitting the data (i.e., while stationary) or during data transmission (i.e., inflight). For example, data set 200 may have undergone application-level processing at data sending entity 300 and is currently in-flight to data recipient entity 400 via an internal intranet or the like.

In response to data set 310 receipt, AI engine 210 is configured to execute at least one of the ML model(s) 220 which have been trained and configured to perform a data security determination 230 to determine whether to implement one or more data security techniques on the data set (i.e., whether the data set 310 requires security or further security if security has already been applied to the data set 310). In response to determining that the data set requires security (i.e., one or more data security techniques are to be implemented), AI engine 210 is configured to execute at least one of the ML model(s) 220 which have been trained and configured to perform security technique identification 240 to identify at least one data security technique 260 from amongst a plurality of data security techniques. The security technique 260, or in some embodiments of the invention, the combination of two or more security techniques 260 are identified by the ML model(s) 230 based on the security technique(s) being most suitable 250 for securing the data during transmission to the data recipient entity 400. The phrase "most relevant" otherwise referred to herein as "optimal" is the output of the ML model(s) 220 that balances contrasting features (discussed infra.) in identifying what security technique 260 or combination of security techniques 260 should be applied to the data set.

System 100 additionally includes second computing platform 500 which includes second memory 502 and one or more second computing processor devices 504 in communication with second memory 502. Second memory 502 stores a plurality of data security applications 510, which are executable by at least one of the second computing processor device(s) 504. Each data security application 510 is configured to implement/apply a corresponding one of the data security techniques 260. Such that, in response to the ML model(s) 220 identifying the at least one data security technique 260, at least one of the plurality of data security applications 510 corresponding to the least one identified data security technique 260 are executed on or otherwise applied to the data set 310. Once the data security technique (s) 260 are executed on or otherwise applied to the data set 310, the data set 250 is transmitted (or transmission continues) to data recipient entity or entities 400.

In specific embodiments of the invention, data security applications 510 are configured as part of the AI engine 210 and/or stored within first memory 202 of first computing platform 200. In such embodiments of the invention, the need for separate and distinct second computing platform 500 is obviated.

Referring to FIG. 2, a block diagram is depicted of first computing platform 200 highlighting various alternate embodiments of the AAI engine 210, in accordance with embodiments of the present invention. First computing platform 200 may comprise one or multiple computing devices, such as servers, storage devices or the like. As previously discussed in relation to FIG. 1, first computing platform 200 includes first memory 202, which may comprise volatile and/or non-volatile memory, such as read-only memory (ROM) and/or random-access memory (RAM), EPROM, EEPROM, flash cards, or any memory common to computing platforms. Moreover, first memory 202 may comprise cloud storage, such as provided by a cloud storage service and/or a cloud connection service.

Further, first computing platform 200 includes one or more first computing processor devices 204, which may be an application-specific integrated circuit ("ASIC"), or other chipset, logic circuit, or other data processing device. First computing processor device(s) 204 may execute one or more application programming interface (APIs) 206 that interface with any resident programs, such as AI engine 210 or the like, stored in first memory 202 of first computing platform 200 and any external programs. First computing platform 200 may include various processing sub-systems (not shown in FIG. 2) embodied in hardware, firmware, software, and combinations thereof, that enable the functionality of first computing platform 200 and the operability of first computing platform 200 on a distributed communication network 110 (shown in FIG. 1). For example, processing sub-systems allow for initiating and maintaining communications and exchanging data with other networked devices. For the disclosed aspects, processing sub-systems of first computing platform 200 may include any processing sub-system portion used in conjunction with AI engine 210 and related models, tools, routines, sub-routines, applications, sub-applications, sub-modules thereof.

In specific embodiments of the present invention, first computing platform 200 additionally includes a communications module (not shown in FIG. 2) embodied in hardware, firmware, software, and combinations thereof, that enables electronic communications between components of first computing platform 200 and other networks and network devices. Thus, communication module may include the requisite hardware, firmware, software and/or combinations thereof for establishing and maintaining a network communication connection with one or more devices and/or networks.

As previously discussed in relation to FIG. 1, first memory 202 of first computing platform 300 stores AI engine 210, which includes at least one ML model 220 and is executable by one or more of first computing processing devices 204. AI engine 210 is configured to receive a data set 310, which includes a plurality of data elements 312. In specific embodiments of the invention, the data set 310 is received directly or indirectly from data sending entity 300 (shown in FIG. 1) and is configured for transmission/communication to data recipient entity 400 (shown in FIG. 1) via distributed communication network 110 (shown in FIG. 1). In specific embodiments of the invention, AI engine 210 is implemented at data sending entity 300, either prior to transmitting the data (i.e., while stationary) or during data transmission (i.e., inflight). For example, data set 200 may have undergone application-level processing at data sending entity 300 and is currently in-flight to data recipient entity 400 via an internal intranet or the like.

In response to data set 310 receipt, AI engine 210 is configured to execute at least one of the ML model(s) 220 which have been trained and configured to perform a data security determination 230 to determine whether to implement one or more data security techniques on the data set (i.e., whether the data set 310 requires security or further security if security has already been applied to the data set 310). In specific embodiments of the invention, the determination is based on the security need 232 (e.g., privacy/sensitivity 232-1 of data elements or criticality 232-2 of the data) and, in specific embodiments of the invention, the determination is based balancing the security need 232 against the computing resources 234 (e.g., current availability 234-1 and efficiency 234-2) required to implement/apply the security techniques.

In response to determining that the data set requires security (i.e., one or more data security techniques are to be implemented), AI engine 210 is configured to execute at least one of the ML model(s) 220 which have been trained and configured to perform security technique identification 240 to identify at least one data security technique 260 from amongst a plurality of data security techniques. The security technique 260, or in some embodiments of the invention, the combination of two or more security techniques 260 are identified by the ML model(s) 230 based on the security technique(s) being most suitable 250 for securing the data during transmission to the data recipient entity 400. The phrase "most relevant" otherwise referred to herein as "optimal" is the output of the ML model(s) 220 that balances contrasting features in identifying what security technique 260 or combination of security techniques 260 should be applied to the data set. In specific embodiments of the invention, the features/factors that are considered by the ML model(s) 220 in identifying the data security technique(s) 260 include, but are not limited to, the security need 252 (e.g., privacy/sensitivity 252-1 of data elements or criticality 252-2 of the data), specific computing resources 254 required to implement/apply the specific security technique (s) including availability 254-1 and/or efficiency 254-2 the computing resources 254, identity 256 of the data recipient entity or entities, historical success rates 258 of the data security techniques applied to similar data sets and the like. In specific embodiments of the invention, the ML model(s) 210 are configured to identify the most suitable/optimal data security technique 260, while in other embodiments of the invention the ML model(s) are configured to identify one or a combination of two of more data security techniques 260-1 as the most suitable/optimal to secure the data set during data transmission.

Referring to FIG. 3, a block diagram is depicted of exemplary data security techniques 260, in accordance with embodiments of the present invention. Data security techniques 260 include data masking 262, such as obfuscation 262-1, scrambling 262-2 and anonymization 262-3. Obfuscation 262-1 makes the data difficult to interpret while maintaining its functionality. For example, obfuscating data might involve changing variable names and altering the data structure without affecting its operation. Scrambling 262-2 involves reordering or altering the data in a way that renders it unreadable or unusable without the proper method to unscramble it. This typically makes the data temporarily unusable until it is unscrambled. anonymization 262-3 refers to the process of transforming data in such a way (e.g., adding fake/decoy data or the like) that the individuals or entities to which the data pertains cannot be identified directly or indirectly.

Data security techniques 260 include embedded hidden information 264, such as stenography 264-1 and water marking 264-2. Stenography 264-1 is primarily used for hiding messages or information within other non-suspicious data, such as images, audio, or text. The goal is to conceal the existence of the hidden message so that unintended recipients do not detect it. Water marking 264-2 is typically used to embed identifying information within media to establish ownership, authenticity, or copyright protection. The goal is not necessarily to conceal the information but to make it detectable and sometimes even visible to ensure the media's integrity and traceability, this the water mark may be visible.

Data security techniques 260 include spread spectrum techniques 266, such as frequency hopping 266-1. Frequency hopping 266-1 involves dividing the available bandwidth into multiple channels or frequency slots, a pseudorandom or predetermined sequence dictates the order in which the frequencies are used. Both the transmitter and receiver are synchronized to hop to the same frequencies at the same time. Such transmissions eliminate data interception because a wrongdoer would need to follow the exact hopping pattern to intercept the communication. Without knowledge of the hopping sequence, it becomes extremely challenging to capture the entire signal, thus enhancing confidentiality.

Further, data security techniques 260 include cryptography, such as conventional symmetric or asymmetric encryption, hybrid encryption, hash function encryption, quantum key encryption or the like.

Referring to FIG. 4, a schematic/flow diagram is depicted of a methodology 600 for securing a data transmission, in accordance with embodiments of the present invention. At Event 610, a data is received from a data sending entity 300 and, at Event 620, a decision is made by ML models 220 as to whether the data set requires security. As previously discussed, the decision may be based on security needs of the data elements, such as privacy/sensitivity concerns, criticality concerns (i.e., need for data in upstream applications) or the like. If the ML model(s) 220 decision is that the data set does not require security, at Event 630, the data set is transmitted to the data recipient entity 400 absent any security techniques being implemented/applied. If the ML model(s) 220 decision is that the data set does require security, at Event 640, the ML model(s) identify one or a combination of data security techniques that are most suitable/optimal for imparting security to the further transmission of the data set. Once the one or a combination of data security techniques have been identified, at Event 650, the data security techniques are applied to or implemented on the data set and, at Event 660, the data set is transmitted to the data recipient entity with applicable data security techniques applied/implemented. Where applicable, the data recipient entity 400 will remove the data security techniques upon receipt or prior to using the data.

Referring to FIG. 5, a flow diagram is a depicted of a method 700 for securing transmission of a data set, in accordance with embodiments of the present invention. At Event 710, a data set is received that includes a plurality of data elements. The received data set may be awaiting transmission from a data sending entity/party to one or more data recipient entities/parties or the received data set may be in-flight (i.e., in the midst of data transmission from the from the data sending entity/party to the one or more data recipient entities/parties.

In response to data set receipt, at Event 720, at least one trained ML model is executed to determine whether to the data set requires security (i.e., whether to implement one or more data security techniques on the data set). In specific embodiments of the method, the determination is based on the need for security (e.g., privacy/sensitivity of data elements or criticality of the data) and, in specific embodiments of the invention balancing the need for security against the computing resources (e.g., current availability and efficiency) required to implement/apply the security techniques.

In response to determining that the data set requires security, at Event 730, at least one trained ML model is executed to identify one or a combination of security techniques that are most suitable/optimal for securing the data set during transmission. In specific embodiments of the invention, the determination of most suitable/optimal is based on one or more factors including, but not limited to, the need for security (e.g., privacy/sensitivity of data elements or criticality of the data), availability and/or efficiency of specific computing resources required to implement/apply the specific security technique(s), identity of the data recipient entity or entities, historical success rates of the data security techniques applied to similar data sets and the like. In specific embodiments of the method, the data security techniques may include, but are not limited to, data masking, such as obfuscation, scrambling, anonymization and the like; embedded hidden information, such as stenography, water marking or the like; and multiplexing and spread spectrum techniques including frequency hopping and the like.

In response to the ML model identifying the at least one data security technique, at Event 740, the data security technique(s) are applied to or otherwise implemented on the data set either prior to data transmission or during data transmission (i.e., "in-flight").

Thus, as described in detail above, present embodiments of the invention include systems, methods, computer program products and/or the like that implement, either prior to or during data transmission, Artificial Intelligence (AI) in the form of Machine Learning (ML) model(s) to (i) determine whether a specific data set requires security and, in response to determining that the data set requires security, (ii) identifying which security technique or combination of security techniques are most suitable/optimal for the data set. Subsequently, the identified security measures are applied to the data set prior to or during data transmission. The determination of whether to a data set requires security and the identification of the security techniques balances the need for security in terms of data sensitivity and/or criticality against availability and/or efficiency of computing resources required to perform/apply the security technique (s) to the data set.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing transmission of a data set, the system comprising:

a first computing platform including a first memory and one or more first computing processor devices in communication with the first memory, wherein the first memory stores:

an Artificial Intelligence (AI) engine including one or more machine learning models (ML), wherein the AI engine is executable by at least one of the one or more first computing processor devices and configured to:

receiving a data set that includes a plurality of data elements;

execute at least one of the one or more ML models, wherein the at least one of the one or more ML models is trained to (i) determine whether to implement one or more data security techniques on the data set and, in response to determining that one or more data security techniques are to be implemented on the data set, (ii) identify at least one data security technique from amongst a plurality of data security techniques, wherein the at least one data security technique is identified based on the at least one data security technique being most suitable for securing the data set during transmission, wherein the most suitable is based on (a) privacy and criticality of the data elements in the data set, (b) identity of one or more data recipient entities of the data set, (c) historical success rates associated with each of plurality of data security techniques on similar data sets, and (d) current availability and efficiency of computing resources required to execute a corresponding one of the plurality of data security applications; and a second computing platform including a second memory and one or more second computing processor devices in communication with the second memory, wherein the second memory stores:

a plurality of data security applications, each data security application executable by at least one of the one or more second computing processor devices, and configured to implement one of the plurality of data security techniques, wherein, in response to the at least one of the one or more ML models identifying the at least one data security technique, execute, on the data set, at least one of the plurality of data security applications corresponding to the least one data security technique to implement the least one data security technique on the data set.

2. The system of claim 1, wherein the plurality of data security techniques comprise data masking techniques including one or more of (i) data obfuscation, (ii) data scrambling, and (iii) data anonymization.

3. The system of claim 1, wherein the plurality of data security techniques comprise frequency hopping.

4. The system of claim 1, wherein the plurality of data security techniques comprises embedded hidden information including one or more of (i) stenography and (ii) digital watermarking.

5. The system of claim 1, wherein at least one of the one or more ML models is trained to (ii) identify the at least one data security technique from amongst a plurality of data security techniques, wherein the at least one data security technique is further defined as a combination of two or more of the plurality of data security techniques, wherein the combination of two or more data security techniques are identified based on the combination of two or more of the data security techniques being most suitable for securing the data set during transmission.

6. The system of claim 1, wherein (i) the AI engine is configured to receive the data set and execute at least one of the one or more ML models and (ii) the at least one of the plurality of data security applications is configured to be executed while the data set is inflight between a data sending entity and one or more data recipient entities.

7. A computer-implemented method for securing transmission of a data set, the computer-implemented method is executable by one or more computing processor devices and comprises:

receiving a data set that includes a plurality of data elements;

executing at least one trained Machine Learning (ML) model to determine whether to implement one or more data security techniques on the data set;

in response to determining that one or more data security techniques are to be implemented on the data set, executing the at least one trained Machine Learning (ML) model to identify at least one data security technique from amongst a plurality of data security techniques, wherein the at least one data security technique is identified based on the at least one data security technique being most suitable for securing the data set during transmission, wherein the at least one data security technique is identified as the most suitable for securing the data set during transmission, wherein the most suitable is based on (a) privacy and criticality of the data elements in the data set, (b) identity of one or more data recipient entities of the data set, (c) historical success rates associated with each of plurality of data security techniques on similar data sets, and (d) current availability and efficiency of computing resources required to execute a corresponding one of the plurality of data security applications; and in response to the ML model identifying the at least one data security technique, implementing the at least one data security technique on the data set.

8. The computer-implemented method of claim 7, wherein the plurality of data security techniques comprises (i) data masking techniques including one or more of data obfuscation, data scrambling, and data anonymization, (ii) embedded hidden information including one or more of stenography and digital watermarking, and (iii) frequency hopping.

9. The computer-implemented method of claim 7, wherein executing the at least one trained ML model to identify further comprises executing the at least one trained ML model to identify a combination of two or more of the plurality of data security techniques, wherein the combination of two or more data security techniques are identified based on the combination of two or more of the data security techniques being most suitable for securing the data set during transmission.

10. The computer-implemented method of claim 7, wherein the computer-implemented method is executed while the data set is inflight between a data sending entity and one or more data recipient entities.

11. A computer program product including a non-transitory computer-readable medium, the non-transitory computer-readable medium comprising sets of codes for causing one or more computing devices to:

receive a data set that includes a plurality of data elements;

execute at least one trained Machine Learning (ML) model to determine whether to implement one or more data security techniques on the data set;

in response to determining that one or more data security techniques are to be implemented on the data set, execute the at least one trained ML model to identify at least one data security technique from amongst a plurality of data security techniques, wherein the at least one data security technique is identified based on the at least one data security technique being most suitable for securing the data set during transmission, wherein the at least one data security technique is identified as the most suitable for securing the data set during transmission, wherein the most suitable is based on (a) privacy and criticality of the data elements in the data set, (b) identity of one or more data recipient entities of the data set, (c) historical success rates associated with each of plurality of data security techniques on similar data sets, and (d) current availability and efficiency of computing resources required to execute a corresponding one of the plurality of data security applications; and in response to the trained ML model identifying the at least one data security technique, implement the at least one data security technique on the data set.

12. The computer program product of claim 11, wherein the plurality of data security techniques comprises (i) data masking techniques including one or more of data obfuscation, data scrambling, and data anonymization, (ii) embedded hidden information including one or more of stenography and digital watermarking, and (iii) frequency hopping.

13. The computer program product of claim 11, wherein the set of codes for causing the one or more computing devices to execute the at least one trained ML model to identify further cause the one or more computing devices to execute the at least one trained to identify a combination of two or more of the plurality of data security techniques, wherein the combination of two or more data security techniques are identified based on the combination of two or more of the data security techniques being most suitable for securing the data set during transmission.

14. The computer program product of claim 11, wherein the sets of codes are executed while the data set is inflight between a data sending entity and one or more data recipient entities.

* * * * *